US011208340B2

(12) United States Patent
Ju

(10) Patent No.: US 11,208,340 B2
(45) Date of Patent: Dec. 28, 2021

(54) MULTI-STEP METHOD FOR PRODUCING ALGAE PRODUCTS

(75) Inventor: Lu-Kwang Ju, Akron, OH (US)

(73) Assignee: University of Akron, Akron, OH (US)

( * ) Notice: Subject to any disclaimer, the term of this patent is extended or adjusted under 35 U.S.C. 154(b) by 759 days.

(21) Appl. No.: 12/811,542

(22) PCT Filed: Dec. 30, 2008

(86) PCT No.: PCT/US2008/088504
§ 371 (c)(1),
(2), (4) Date: Jul. 2, 2010

(87) PCT Pub. No.: WO2009/088839
PCT Pub. Date: Jul. 16, 2009

(65) Prior Publication Data
US 2010/0297714 A1    Nov. 25, 2010

Related U.S. Application Data

(60) Provisional application No. 61/018,957, filed on Jan. 4, 2008.

(51) Int. Cl.
*C12P 7/64*    (2006.01)
*C12P 1/00*    (2006.01)
(Continued)

(52) U.S. Cl.
CPC .............. *C02F 3/32* (2013.01); *A01G 33/00* (2013.01); *C10L 5/44* (2013.01); *C02F 1/66* (2013.01);
(Continued)

(58) Field of Classification Search
CPC .......... C02F 3/32; C02F 1/66; C02F 2101/38; C10L 5/44; A01G 33/00; Y02A 40/80; Y02E 50/30; Y02E 50/10
See application file for complete search history.

(56) References Cited

U.S. PATENT DOCUMENTS 3,732,089 A * 5/1973 Mergonigle .............. C02F 3/32
71/8
3,955,318 A * 5/1976 Hulls .............................. 47/1.4
(Continued)

FOREIGN PATENT DOCUMENTS

DE    4018820    * 12/1991

OTHER PUBLICATIONS

Urabe et al. "Effects of phosphorus supply on phagotropy by the mixtrophic algae Uroglena americana" Aquatic Microbial Ecology vol. 18, 77-83, 1999.*

(Continued)

*Primary Examiner* — Blaine Lankford
*Assistant Examiner* — Lauren K Van Buren
(74) *Attorney, Agent, or Firm* — Renner Kenner Greive Bobak Taylor & Weber

(57) ABSTRACT

A multi-step method for producing an algae product comprising, a microorganism consumption step, another step, and an algae product collection step. The microorganism consumption step comprises, combining a liquid growth medium comprising microorganisms with a phagotrophic algae capable of producing a desired algae product, consuming said microorganisms by said phagotrophic algae, and growing said phagotrophic algae. Another step comprises either a microorganism growth step or a photosynthetic algal growth step. A microorganism growth step comprises providing a liquid growth medium comprising nutrients and microorganisms capable of said consuming said nutrients, consuming said nutrients by said microorganisms, and growing said microorganisms. A photosynthetic algal growth step comprises providing a substantially organic nutrient depleted liquid medium, providing a microorganism population comprising said phagotrophic algae, photosynthetic growth of said phagotrophic algae. An algae (Continued)

product collection step comprises collecting a desired algae product from said phagotrophic algae.

16 Claims, 3 Drawing Sheets

(51) Int. Cl.
*C02F 3/32* (2006.01)
*C10L 5/44* (2006.01)
*A01G 33/00* (2006.01)
*C02F 1/66* (2006.01)
*C02F 101/38* (2006.01)

(52) U.S. Cl.
CPC ........... *C02F 2101/38* (2013.01); *Y02A 40/80* (2018.01); *Y02E 50/10* (2013.01); *Y02E 50/30* (2013.01)

(56) References Cited

U.S. PATENT DOCUMENTS

| | | | | |
|---|---|---|---|---|
| 4,253,271 | A * | 3/1981 | Raymond | A01G 9/243 47/1.4 |
| 2002/0194641 | A1* | 12/2002 | Metz | C12N 15/52 800/281 |
| 2005/0141966 | A1* | 6/2005 | Greene | 405/129.65 |
| 2006/0188969 | A1* | 8/2006 | Barclay | C12P 7/6427 435/169 |

OTHER PUBLICATIONS

El-Sheek et al. "Effect of Phosphorus Starvation on Growth, Photosynthesis and Some Metabolic Processes in the Unicellular Green Algae Chlorella kessleri" Phyton, vol. 35, 139-151 (Year: 1995).*
International Preliminary Report on Patentability dated Jul. 6, 2010, dated Jul. 15, 2010.
Written Opinion of the International Searching Authority dated Jul. 15, 2010.

* cited by examiner

MULTI-STEP METHOD FOR PRODUCING ALGAE PRODUCTS

This application claims priority to a provisional patent application having Ser. No. 61/018,957, filed on Jan. 4, 2008.

TECHNICAL FIELD

Provided is a process for producing useful algae products from media comprising organic materials and/or microorganisms. More particularly, provided is a multi-step process for producing algae and/or algae products from media comprising organic materials and/or microorganisms.

BACKGROUND

Algae can produce a wide variety of commercially and industrially valuable products. Algae can also treat, breakdown, convert, process, or otherwise eliminate many kinds of waste products. In certain situations, algae can produce commercially and industrially valuable products directly or indirectly from waste products or other growth media.

Algae are useful for producing products including, but not limited to, food, fertilizers, pharmaceuticals, dyes, bioplastics, lipids, feedstock for chemical production, and feedstock for energy production. Lipids can be used to produce valuable products such as biodiesel.

Sustainable biodiesel production is dependent upon development of renewable feedstock. Presently, the renewable feedstock is provided by edible oils such as soybean oil, palm oil, and rapeseed oil. It is of interest to develop additional types of renewable feedstock such as lipids from algae.

One factor making algae interesting as a source of renewable feedstock is that algae may be grown under conditions or in places not suitable to other sources of renewable feedstock. Accordingly, algae may be grown and used in ways that do not significantly compete with food sources or agriculturally productive land.

An additional factor making algae of interest is the availability of material to convert to biodiesel or other fuel. Some algae have a lipid content on the order of 50% to 70% of their dry weight. By way of comparison, the lipid content in dry soybeans is approximately 20%. Algal lipids have a similar composition to vegetable oil and are readily adaptable as feedstock to existing biodiesel manufacturing processes. The remaining algal biomass may be converted to bio-ethanol, converted to biodiesel, converted to methane, burned, or used as food for other organisms.

Waste water treatment is an essential and costly requirement of modern society. In some applications the purpose of biological waste water treatment is to remove organics and nitrogen-containing and/or phosphorous-containing materials. In some applications the purpose of biological waste water treatment is to remove harmful materials such as heavy metals or other materials. Algae can treat, breakdown, convert, or process waste water effectively in many waste water treatment applications.

In addition to the desired end of treated waste water, treating waste water or any waste product with algae creates an opportunity to use the waste product as medium for the growth of desirable algae and the end of desirable algae products including, but not limited to, food, fertilizers, pharmaceuticals, dyes, bio-plastics, lipids, feedstock for chemical production, and feedstock for energy production.

Existent waste water treatment processes have sought to minimize the production of microbial population or activated sludge because activated sludge disposal represents an additional cost and/or incurs environmental concerns.

Improved methods, process conditions, and designs for the growth of algae in waste water continue to be of great interest. Improved methods for ensuring the establishment of desired algae species as a dominant population in a waste water treatment end product continue to be of great interest. Improved methods for production of algae products in many growth media continue to be of great interest.

SUMMARY

Provided is a multi-step method for producing an algae product comprising, a microorganism consumption step, another step, and an algae product collection step. The microorganism consumption step comprises, combining a liquid growth medium comprising microorganisms with a phagotrophic algae capable of producing a desired algae product, consuming the microorganisms by the phagotrophic algae, and growing the phagotrophic algae. Another step comprises either a microorganism growth step or a photosynthetic algal growth step. A microorganism growth step comprises providing a liquid growth medium comprising nutrients and microorganisms capable of the consuming the nutrients, consuming the nutrients by the microorganisms, and growing the microorganisms. A photosynthetic algal growth step comprises providing a substantially organic nutrient depleted liquid medium, providing a microorganism population comprising the phagotrophic algae, photosynthetic growth of the phagotrophic algae. An algae product collection step comprises collecting a desired algae product from the phagotrophic algae.

Also provided is a multi-step method for producing an algae product from waste water treatment comprising a waste consumption step, a microorganism consumption step, and an algae product collection step. A waste consumption step comprises combining waste water comprising organic waste products with microorganisms capable of consuming the organic waste products and treating the waste water by consuming the organic waste products by the microorganism and growing the microorganisms. A microorganism consumption step comprises combining the combined waste water and microorganisms with a phagotrophic algae capable of producing a desired algae product, consuming the microorganisms by the phagotrophic algae, and growing the phagotrophic algae. An algae product collection step comprises collecting a desired algae product from the phagotrophic algae.

Also provided is a multi-step method for producing lipids comprising a waste consumption step, a microorganism consumption step, and an algae product collection step. A waste consumption step comprises combining waste water comprising organic waste products with microorganisms capable of consuming organic waste products and treating said waste water by consuming said organic waste products by said microorganism and growing said microorganisms. A microorganism consumption step comprises combining said combined waste water and microorganisms with a phagotrophic algae capable of producing a desired lipid, consuming of microorganisms by said phagotrophic algae, and growing said phagotrophic algae. An algae product collection step comprises collecting said lipid from said phagotrophic algae.

DETAILED DESCRIPTION

Figure 1:
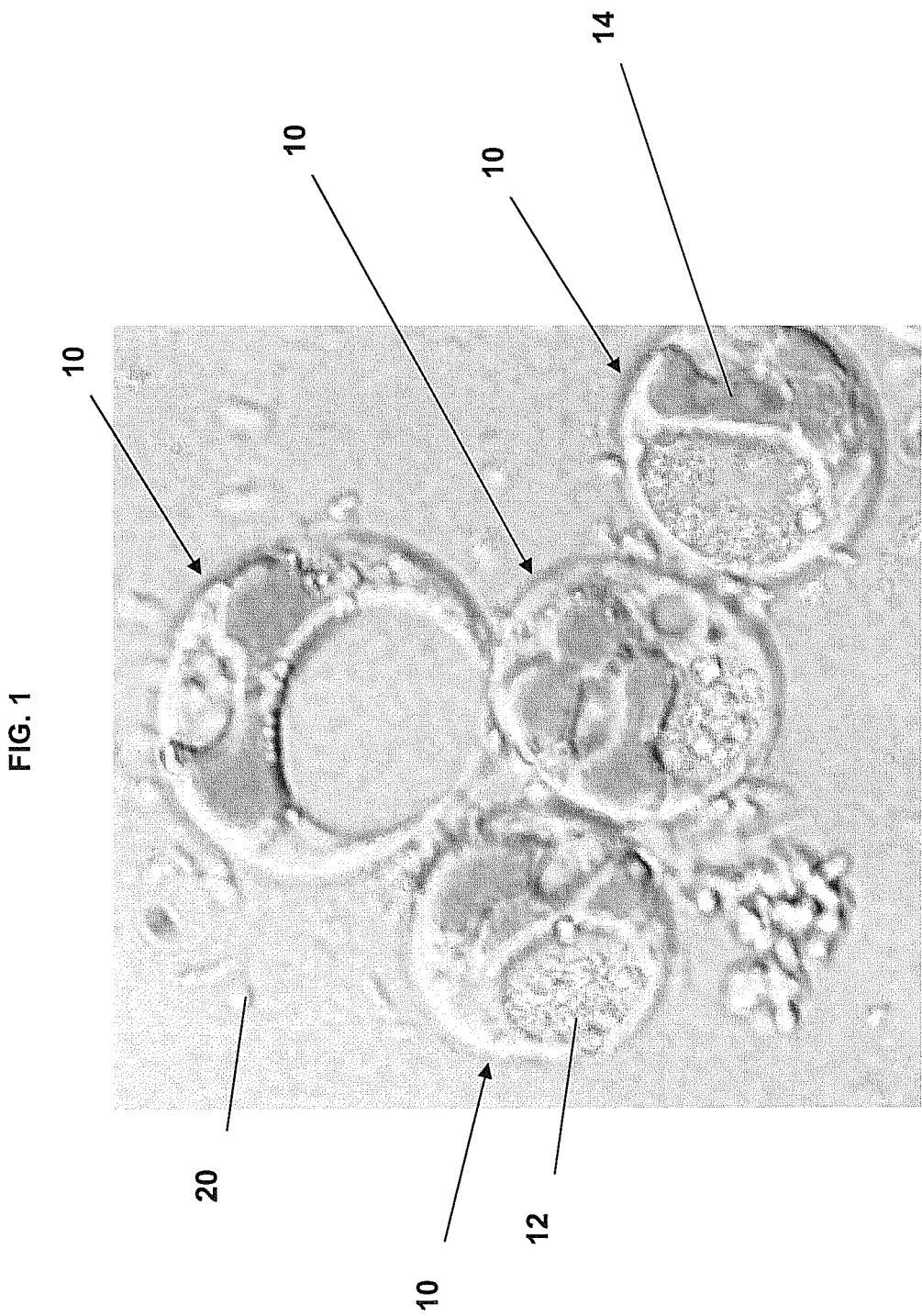
FIG. 1 shows a phagotrophic algae and free bacteria.

There are many species of algae and other microorganisms. Some species of algae are desirable algae which are desirable to grow, cultivate or farm. Some desirable algae species can grow under phototrophic metabolism. Some desirable algae species can grow under heterotrophic metabolism. Some desired algae species can grow under heterotrophic metabolism or under mixotrophic, both phototrophic and heterotrophic, metabolism. Some desired algae species grow much faster under heterotrophic metabolism than under phototrophic metabolism. Some algae are capable of phagotrophy; algae capable of phagotrophy will be referred to herein as "phagotrophic algae". Referring to FIG. 1, phagotrophic algae (10) and bacteria (20) are shown. The phagotrophic algae (10) can consume the bacteria (20) as food. Shown in FIG. 1 is a food vacuole (12) containing ingested bacteria and a chromatophore (14) containing algae products. Some desired algae species grow much faster under phagotrophic metabolism than do other non-algae phagotrophic organisms such as protozoa.

Microorganisms comprise microscopic organisms of all kinds. Microorganisms comprise bacteria, microalgae, yeast, and fungi.

Algae production may be pursued using photosynthetic cultivation. Algae are capable of growing in very simple aqueous media with light as an energy source and $CO_2$ as a carbon source. Because of the self-shading and light saturation properties of algae cultures, the light penetration can be very shallow, on the order of a few centimeters. This can result in the loss of useable light as heat and fluorescence. In certain embodiments, photosynthetic cultivation operations use shallow ponds, complex containment vessels, or energy consumptive agitation in order to increase the amount of algae that can be grown with the available resources. Multi-stage algae production methods may build upon or include photosynthetic cultivation methods.

Provided are processes for algal growth comprising the use of materials in a growth medium as nutrients. A growth medium is a medium comprising nutrients usable to support the growth of microorganisms and/or algae. A growth medium may comprise waste materials such as, without limitation, waste water, sewage, raw sewage, liquefied solid waste, washing water, grey water, drainage, black water, industrial effluvia, residential effluvia, commercial effluvia, other waste, or combinations thereof. A growth medium may also comprise non-waste materials, such as, without limitation, food processing by-products, sugar solutions, starch solutions, wort, mash, malt, grist, and agar. Nutrients may comprise, without limitation, organics, nitrogen-containing materials, and/or phosphorous-containing materials.

In certain of the provided processes, microorganisms consume organics, nitrogen-containing materials, phosphorous-containing materials, and/or other nutrients for their growth and the microorganisms are, in turn, consumed by phagotrophic algae; thereby growing phagotrophic algae and promoting the production of algae products from the phagotrophic algae. In certain of the provided processes, desirable algae consume organics, nitrogen-containing materials, phosphorous-containing materials, and/or other nutrients for their growth; thereby growing algae and promoting the production of algae products.

Production of algae products is a function of multiple factors affecting algae growth including growth medium composition, weather, other microorganisms, and microbial interactions. Growth medium composition can vary due to input, age, and in some embodiments, location. Weather is known to vary with location and time. Variable growth medium composition and growth competition between desired algal species and other organisms can reduce the output of desirable algae and reduce the production of desirable algae products. Certain of the provided processes employ selection pressures to promote the establishment of desirable algae species as a predominant population in the end culture.

Figure 3:
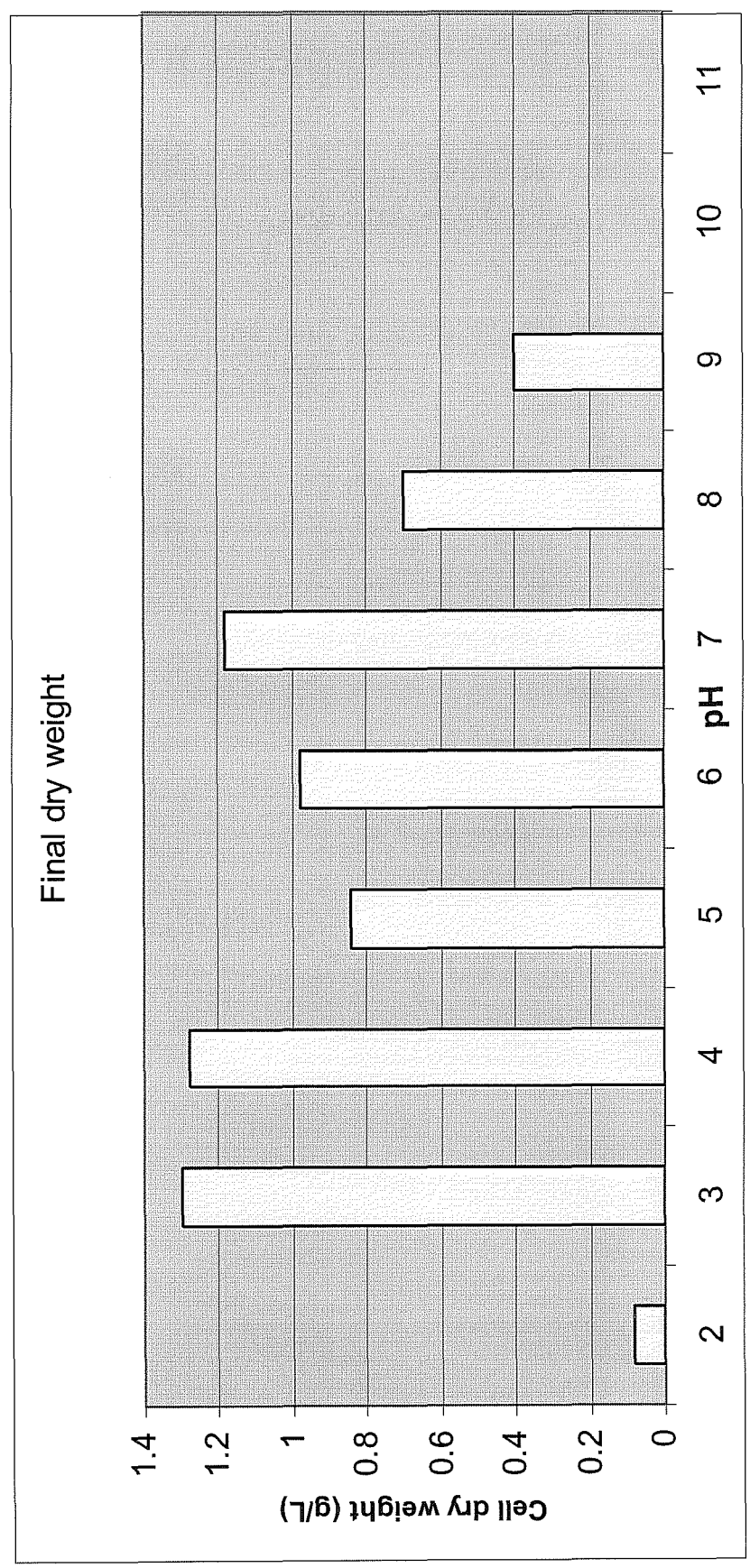
FIG. 3 shows graphical results of the effects of pH on algal growth in one experiment.

In certain embodiments, processes use operating conditions and process designs to apply selection pressures favorable to the growth of the desired algae species over the growth of other microorganisms present in the growth environment. A selection pressure can be any condition, ability, or trait which favors the growth of or survival of certain species over that of other species. In certain embodiments, the selection pressure favors the growth of a single algae species over that of other species In certain embodiments the selection pressure comprises pH conditions. Election of any pH which favors the growth of or survival of a selected species over that of other species is a selection pressure comprising pH conditions. In certain embodiments a selected species will be a species of algae that is capable of producing a valuable algae product. Algal species are known to grow well in a much wider range of pH than other common microorganisms. Referring to FIG. 3, the graph shows the dry cell weight of the algae in g/L on the vertical axis of the graph as grown at the pH indicated on the horizontal axis of the graph. The algae grow and produce valuable algae products well even at pH levels that slow, inhibit, or substantially prevent the growth of competing organisms. By way of a non-limiting example, common bacteria that grow rapidly near neutral pH, pH near 7, cannot grow fast at low pH such as 3-4. As shown, the algae grow well and produce valuable algae products even at a pH levels as low as 3 and as high as 8. Because algal species are more tolerant of pH extremes than other common microorganisms, inducing pH extremes can favor the growth of algae species over the growth of other microorganisms. In certain embodiments pH conditions may range from a pH of 3 to a pH of 8.

In certain embodiments the selection pressure comprises impoverished or depleted conditions wherein nutrient sources in the growth medium are substantially depleted or rarified. Certain algae species are able to survive and grow phototrophically in the absence of organics or inorganics as an energy source. Algae can grow in, or at least tolerate and survive, organic depleted conditions. Under organic depleted conditions, other heterotrophic organisms will tend to die off from starvation. Organic depleted conditions can be created by encouraging consumption of the existing organic materials. In certain embodiments, conditions can be created to have a culture of microorganisms grow under heterotrophic metabolism and then switch to lighted and depleted organic conditions or lighted and no organic conditions.

In certain embodiments the selection pressure comprises the ability of some mixotrophic algae to grow by ingesting other microorganisms directly as food. In certain processes, this ability to grow by ingesting other microorganisms directly as food can be used to increase the ratio of desired algae in the microorganism population by allowing the algae to grow by ingesting other microorganisms and/or the nutrients released from the lysis of other microorganisms.

In certain embodiments, the method for growth of algae comprises multiple steps or stages. Each step or stage may comprise different conditions or different selection pressures to promote the growth of different microorganisms or to modify the medium conditions by the action of the microorganisms, or both. For example, and without limitation, establishing conditions which favor the growth of a particular microorganism that consume organic materials will tend to modify the medium conditions by increasing the amount of that particular microorganism and will tend to diminish the organic materials that are consumed by that particular microorganism. In certain embodiments, steps or stages are combined such that the end conditions produced by one step or stage are the desired starting conditions for a subsequent stage or step.

In certain multiple step embodiments, the first step can comprise conditions that encourage the growth of microorganisms using growth medium that contains some non-zero concentration of organic materials usable by the microorganisms as nutrients. Growth of microorganisms promotes the consumption or depletion of materials usable by the microorganisms as nutrients. During the first step of certain embodiments, materials usable by the microorganisms as nutrients are reduced by consumption. Without limitation, in embodiments wherein the growth medium is a waste product, the consumption of nutrients may also act as treatment of the waste product. In the second step of certain embodiments, the growth medium and the microorganism population therein is combined with a population of microorganism-consuming algae. In certain embodiments this is done by combining an algae culture with the growth medium. If the organic materials usable by the microorganisms as nutrients remain in a substantial concentration the faster-growing heterotrophic microorganisms will grow to dominate the growth region. In certain embodiments, the faster-growing heterotrophic microorganisms are bacteria. Domination of the growth region by bacteria can block light penetration in the growth region and deny organic food for maintaining the population of other organisms.

In certain multiple step embodiments, the first step can comprise conditions that encourage the growth of microorganisms using growth medium that contains a high concentration of organic materials usable by the microorganisms as nutrients. Growth of microorganisms promotes the consumption or depletion of organic materials usable by the microorganisms as nutrients. During the first step of certain embodiments organic materials usable by the microorganisms as nutrients are substantially eliminated or rarified by consumption. In the second step of certain embodiments, the growth medium and the microorganism population therein is combined with a population of microorganism-consuming algae. Because the organic materials usable by the microorganisms as nutrients are substantially eliminated or rarified, the microorganism-consuming algae will develop by eating the other microorganisms while the other microorganisms will develop to a lesser degree because of the lack of usable nutrients; accordingly the microorganism-consuming algae will tend to develop as the dominant population. In certain multiple step embodiments a third stage exists in which the algae-dominated culture from stage two is subjected to lighted and depleted organic conditions or lighted and no organic conditions.

Figure 2:
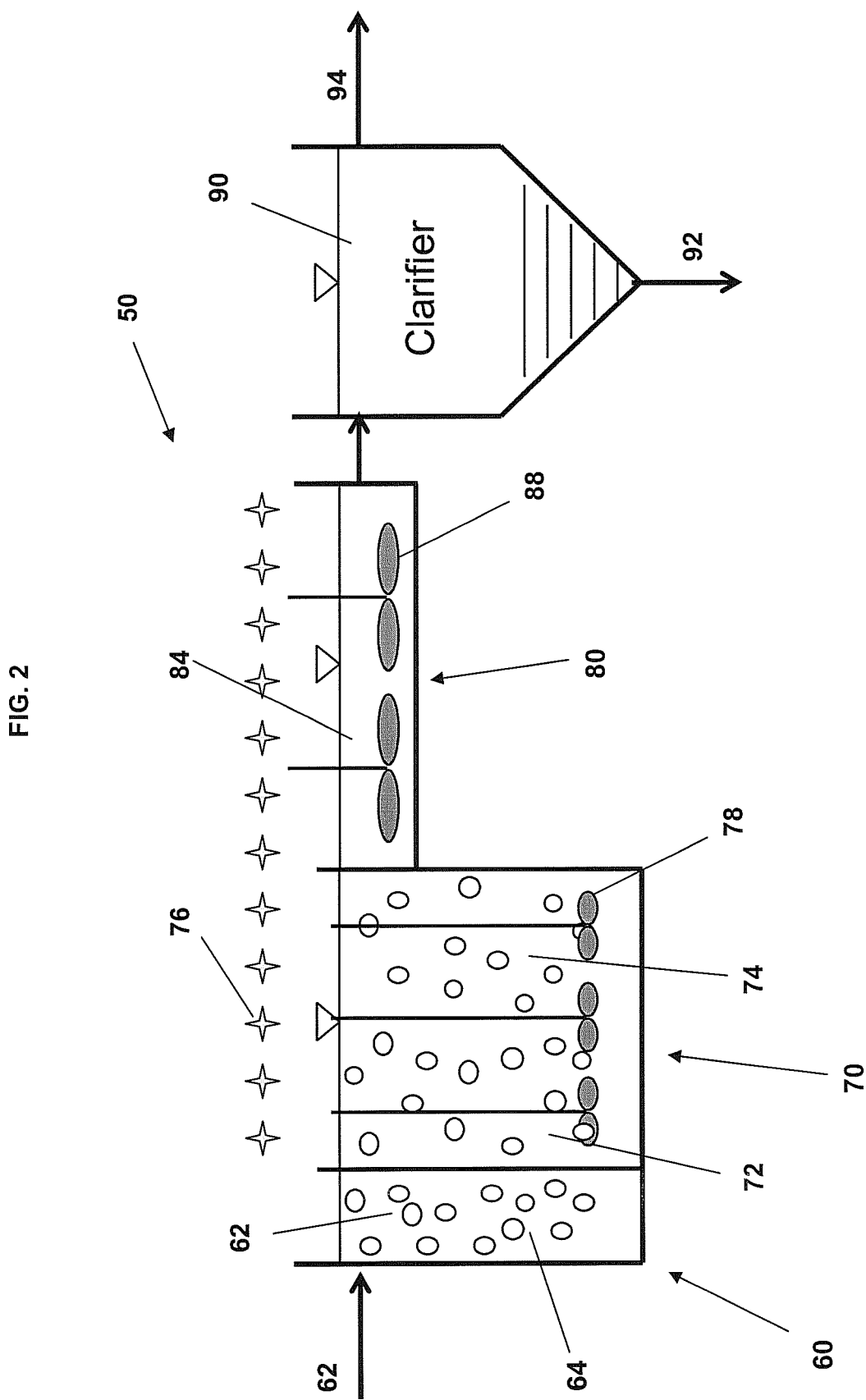
FIG. 2 shows an embodiment of a multi-stage process for producing algae products.

FIG. 2 shows a non-limiting embodiment of a multi-step method for producing an algae product. Illustrated is a multi-step process (50) for production of an algae product. In a first stage (60), a growth medium (62) is introduced to a first growth region (64). Also introduced to the grown region (64) are microorganisms (not shown). The microorganisms (not shown) consume nutrients (not shown) from the growth medium (62) and grow. The first stage (60) continues at least until the nutrients (not shown) from the growth medium (62) are substantially depleted by consumption by the microorganisms (not shown).

In a second stage (70), the nutrient depleted growth medium (72) is introduced to a second growth region (74). Also introduced to the second growth region (74) are the microorganisms (not shown) grown in the first stage. Also introduced to the second growth region (74) are phagotrophic algae (not shown). The phagotrophic algae (not shown) grow by ingesting the microorganisms (not shown) grown in the first stage (60). Without limitation, in the embodiment shown in FIG. 2, the phagotrophic algae (not shown) have the capability to grow photosynthetically. The second stage (70) may optionally include natural or artificial lighting (76). The second stage (70) may optionally include mechanical mixing or aeration (78). The second stage (70) may optionally include a selection pressure to favor the growth of the phagotrophic algae (not shown) over the growth of the microorganisms (not shown). In certain embodiments, the second stage (70) continues at least until the microorganisms (not shown) grown in the first stage (60) are substantially depleted by consumption by the phagotrophic algae (not shown).

In an optional third stage (80), the nutrient depleted growth medium (72) is introduced to a third growth region (84). Also introduced to the third growth region (84) are the phagotrophic algae (not shown) grown in the second stage (70). The third stage (80) includes natural or artificial lighting (76). The third growth region (84) is shallow to allow for light penetration throughout the growth region from the natural or artificial lighting (76). The third stage (80) may optionally include mechanical mixing or aeration (88). The third stage (80) may optionally include the addition of carbon dioxide. The third stage (80) may optionally include a selection pressure to favor the growth of the phagotrophic algae (not shown) over the growth of any remaining microorganisms (not shown). In the low nutrient environment of the third stage (80), the phagotrophic algae can grow photosynthetically to dominate the population of organisms in the growth medium. In certain embodiments, at the end of the third stage there are no significant amounts of any organisms remaining other than the phagotrophic algae (not shown) that produce the algae products.

FIG. 2 shows an optional fourth stage, a clarifier stage (90), included in the process to accept output from the third stage (80). The clarifier separates, at least partially, phagotrophic algae (not shown) that produce the algae products from nutrient depleted growth medium (72). The clarifier routes phagotrophic algae (not shown) to a phagotrophic algae output (92) and routes nutrient depleted growth medium (72) to a nutrient depleted growth medium output (94).

In certain multiple step embodiments, the microorganisms in the first stage are selected for their ability to consume, break-down, convert, or process particular materials in the growth medium. Microorganisms may include, without limitation, enteric bacteria and pseudomonads.

In embodiments involving the treatment of waste materials, sufficient waste material treatment, the removal of most organics, nitrogen-containing materials, and/or phosphorous-containing materials can be achieved by a two or three stage method for growth of algae. If necessary or desired, additional stages for polishing or otherwise treating the treated waste material can be performed.

In certain embodiments, the algae grown comprise members selected from the group consisting of Dinobryon chrysomonads, Chrysophaerella chrysomonads, Uroglena chrysomonads, Catenochrysis chrysomonads, Ochromonas chrysomonads, Chromulina chrysomonads, Chrysococcus chrysomonads, Chrysochromulina prymnesiophytes, Coccolithus *pelagicus* coccolithophorids, Chlorochromonas xanthophytes, Phaeaster chrysophytes, Chrysamoeba chrysophytes, Pedinella chrysophytes, *Ceratium hirundinella*, and Cryptomonas *ovata*.

The produced algae may be harvested by any acceptable means. In certain embodiments algae are harvested by means selected from the group consisting of settling, microscreening, centrifugation, flocculation, froth flotation, and combinations thereof.

Algae products including, but not limited to, food, fertilizers, pharmaceuticals, dyes, bio-plastics, lipids, feedstock for chemical production, and feedstock for energy production, may be collected by any acceptable means. In certain embodiments algae products are collected by means selected from the group comprising mechanical pressing, use of chemical solvents, enzymatic extraction, precipitation, chromatography, adsorption, electrophoresis, crystallization, binding, foam fractionation, osmotic shock, and combinations thereof.

While the multi-step method for producing algae products has been described above in connection with the certain embodiments, it is to be understood that other embodiments may be used or modifications and additions may be made to the described embodiments for performing the same function of the multi-step method for producing algae products without deviating therefrom. Further, all embodiments disclosed are not necessarily in the alternative, as various embodiments may be combined to provide the desired characteristics. Variations can be made by one having ordinary skill in the art without departing from the spirit and scope of the multi-step method for producing algae products. Therefore, the multi-step method for producing algae products should not be limited to any single embodiment, but rather construed in breadth and scope in accordance with the recitation of the attached claims.

I claim:

1. A multi-step method for producing an algae product, the method comprising steps of:
combining, in a first vessel, a growth medium and phagotrophic-algae-consumable microorganisms, the growth medium including nutrients capable of supporting the growth of the phagotrophic-algae-consumable microorganisms, wherein the phagotrophic-algae-consumable microorganisms are selected from the group consisting of bacteria and microalgae,
allowing, in the first vessel, the phagotrophic-algae-consumable microorganisms to consume the nutrients to thereby grow the phagotrophic-algae-consumable microorganisms, to the extent of depleting the nutrients in the entire growth medium by the phagotrophic-algae-consumable microorganisms, thereby converting the entire growth medium to a nutrient depleted medium having grown phagotrophic-algae-consumable microorganisms therein, the entire growth medium being depleted of all organics, nitrogen-containing materials, and phosphorous-containing materials by the phagotrophic-algae-consumable microorganisms, and
directly transferring the nutrient depleted medium having grown phagotrophic-algae-consumable microorganisms therein to a second vessel having phagotrophic algae therein and being depleted of all organics, nitrogen-containing materials, and phosphorous-containing materials; and
allowing, in the second vessel, the phagotrophic algae to engulf the phagotrophic-algae-consumable microorganisms to thereby grow the phagotrophic algae, while simultaneously limiting the development of the phagotrophic-algae-consumable microorganisms and any other microorganisms present in the nutrient depleted medium based on the second vessel and the nutrient depleted medium being depleted of all organics, nitrogen-containing materials, and phosphorous-containing materials, necessary for the growth of the phagotrophic-algae-consumable microorganisms and any heterotrophic microorganisms present in the nutrient depleted medium, to thereby grow the phagotrophic algae as the dominant population in the second vessel while suppressing growth of the phagotrophic-algae-consumable microorganisms by the depletion of all organics, nitrogen-containing materials, and phosphorous-containing materials, wherein the step of allowing the phagotrophic algae to consume the phagotrophic-algae-consumable microorganisms occurs at a pH of from 3 to 5; and
collecting a product, wherein said step of collecting the product consists of collecting a dominantly algae product from the dominant population of the phagotrophic algae.

2. The multi-step method for producing an algae product of claim 1, wherein the growth medium is selected from the group consisting of waste water, a prepared medium, and combinations thereof.

3. The multi-step method for producing an algae product of claim 1, wherein the growth medium is waste water.

4. The multi-step method for producing an algae product of 1, wherein the step of allowing the phagotrophic algae to consume the phagotrophic-algae-consumable microorganisms occurring at a pH of from 3 to 5 serves as a selection pressure favorable to the growth of a phagotrophic algae species over the growth of other microorganisms present in the second vessel.

5. The multi-step method for producing an algae product of claim 4, wherein the step of allowing the phagotrophic-algae-consumable microorganisms to consume the nutrients occurs at a pH of about 7, wherein the step of allowing the phagotrophic-algae-consumable microorganisms to consume the nutrients occurring at a pH of about 7 serves as a selection pressure favorable to the growth of the phagotrophic-algae-consumable microorganisms over the growth of other microorganisms present in the first vessel.

6. The multi-step method for producing an algae product of claim 1, wherein the step of allowing the phagotrophic algae to consume the phagotrophic-algae-consumable microorganisms occurs at a pH of from 3 to 4.

7. The multi-step method for producing an algae product of claim 1, wherein the phagotrophic-algae-consumable microorganisms are selected from the group consisting of enteric bacteria and pseudomonads.

8. The multi-step method for producing an algae product of claim 1, wherein the product is selected from the group consisting of algal biomass, food, fertilizers, pharmaceuticals, dyes, bio-plastics, lipids, biodiesel, bio-ethanol, fuel, feedstock for chemical production, and feedstock for energy production.

9. The multi-step method for producing an algae product of claim 8, wherein the product is lipids.

10. The multi-step method for producing an algae product of claim 1, wherein the phagotrophic algae is selected from the group consisting of Dinobryon chrysomonads, Chrysophaerella chrysomonads, Uroglena chrysomonads, Catenochrysis chrysomonads, Ochromonas chrysomonads, Chromulina chrysomonads, Chrysococcus chrysomonads, Chrysochromulina prymnesiophytes, Coccolithus *pelagicus* coccolithophorids, Chlorochromonas xanthophytes, Phaeaster chrysophytes, Chrysamoeba chrysophytes, Pedinella chrysophytes, *Ceratium hirundinella*, and Cryptomonas *ovata*.

11. The multi-step method for producing an algae product of claim 1, wherein said step of allowing in the second vessel continues at least until the grown phagotrophic-algae-consumable microorganisms grown in the first stage are depleted by consumption by the phagotrophic algae.

12. The multi-step method for producing an algae product of claim 1, wherein the product is a lipid product.

13. The multi-step method for producing an algae product of claim 1, wherein the growth medium comprises industrial effluvia, residential effluvia, commercial effluvia, or a combination thereof.

14. The multi-step method for producing an algae product of claim 1, wherein the step of collecting the product is selected from the group consisting of settling, microscreening, centrifugation, flocculation, and froth flotation.

15. A method for producing an algae product, the method comprising steps of providing a growth medium having a liquid medium, microorganisms, and organic materials usable by the microorganisms as nutrients, allowing the microorganisms to consume the organic materials usable by the microorganisms as nutrients to thereby form grown microorganisms, to the extent of forming a second medium comprising the liquid medium and the grown microorganisms, wherein all organic materials usable by the grown microorganisms as nutrients are eliminated in the entire second medium by the microorganisms, combining phagotrophic algae with the second medium to form an algae-growth medium, wherein the algae-growth medium is eliminated of all organic materials usable by the grown microorganisms as nutrients, allowing the phagotrophic algae to engulf the grown microorganisms in the algae-growth medium to thereby grow the phagotrophic algae to form grown phagotrophic algae, wherein, during said step of allowing the phagotrophic algae to consume the grown microorganisms, any heterotrophic microorganisms in the algae-growth medium other than the phagotrophic algae develop less than the phagotrophic algae based on the second medium and the algae-growth medium being eliminated of all organic materials usable as nutrients, thereby developing the grown phagotrophic algae as the dominant population while suppressing growth of the microorganisms by the elimination of all organic materials usable by the grown microorganisms as nutrients, and collecting a product, wherein said step of collecting the product consists of collecting a dominantly algae product from the dominant population of the grown phagotrophic algae.

16. The multi-step method for producing an algae product of claim 15, wherein the growth medium comprises industrial effluvia, residential effluvia, commercial effluvia, or a combination thereof.

* * * * *